(12) United States Patent
Hummel et al.

(10) Patent No.: US 6,296,319 B1
(45) Date of Patent: Oct. 2, 2001

(54) FASTENING ARRANGEMENT FOR A VEHICLE WHEEL CONSISTING OF AN INTERIOR WHEEL SHELL AND OF AN EXTERIOR WHEEL SHELL

(75) Inventors: Frank Hummel, Eningen; Jens Stach, Heimsheim, both of (DE)

(73) Assignee: Dr. Ing. h.c.F. Porsche AG, Weissach (DE)

( * ) Notice: Subject to any disclaimer, the term of this patent is extended or adjusted under 35 U.S.C. 154(b) by 0 days.

(21) Appl. No.: 09/206,395

(22) Filed: Dec. 7, 1998

(30) Foreign Application Priority Data

Dec. 6, 1997 (DE) .............................. 197 54 188

(51) Int. Cl.[7] .......................... B60B 11/00; F16B 39/02; F16B 43/02; F16D 65/10
(52) U.S. Cl. .................. 301/35.62; 301/64.2; 301/64.4; 411/82; 411/537; 188/218 L
(58) Field of Search ......................... 301/35.62 I, 35.54, 301/35.57, 65, 64.1, 64.2, 64.3, 64.4; 188/218 L, 264 A, 264 AA; 411/82, 82.2, 82.3, 258, 537, 930

(56) References Cited

U.S. PATENT DOCUMENTS

| 1,794,564 | * | 3/1931 | White .................. 301/64.1 |
| 1,892,606 | * | 12/1932 | Bourdon .................. 301/64.1 |
| 2,140,672 | * | 12/1938 | Gray et al. .................. 277/316 |
| 2,352,487 | * | 6/1944 | McNamara, Jr. .................. 301/35.62 |
| 3,746,399 | * | 7/1973 | Verdier .................. 301/65 |
| 3,749,362 | * | 7/1973 | O'Connor et al. .................. 411/537 |
| 3,835,615 | * | 9/1974 | King, Jr. .................. 411/82 |
| 4,679,860 | | 7/1987 | Koishi et al. .................. 307/9 DN |
| 5,263,997 | * | 11/1993 | Parker et al. .................. 411/537 |
| 5,454,628 | * | 10/1995 | Maiworm et al. .................. 301/65 |
| 5,538,329 | * | 7/1996 | Stach .................. 301/64.2 |
| 5,853,520 | * | 12/1998 | Rich et al. .................. 411/258 |
| 5,918,947 | * | 7/1999 | Stach et al. .................. 301/64.1 |

FOREIGN PATENT DOCUMENTS

| 7200847 | 1/1972 | (DE) . |
| 2 235 619 | 1/1974 | (DE) . |
| 26 39 483 | 3/1978 | (DE) . |
| 43 06 484 | 7/1994 | (DE) . |
| 196 01 778 | 4/1997 | (DE) . |
| 5-278402 | 10/1993 | (JP) . |

* cited by examiner

Primary Examiner—S. Joseph Morano
Assistant Examiner—Jason R. Bellinger
(74) Attorney, Agent, or Firm—Evenson, McKeown, Edwards & Lenahan, P.L.L.C.

(57) ABSTRACT

A fastening arrangement for a motor vehicle wheel made of a light metal alloy which is formed by an interior wheel shell and an exterior wheel shell which are fastened to a wheel disk chamber by way of wheel bolts which are arranged concentrically with respect to a wheel hub. The two shells of the wheel can be connected in a mutually sealed manner by way of wheel bolts inserted in bushes, and the bushes are pressed into bores of the shells and held in an embedded manner in a sealing mass. A spacer member is interposed between the wheel chamber and the interior wheel shell. The spacer member is made of a material different than the material of the interior wheel shell and the material of the brake chamber, to facilitate corrosion resistance.

20 Claims, 3 Drawing Sheets

FASTENING ARRANGEMENT FOR A VEHICLE WHEEL CONSISTING OF AN INTERIOR WHEEL SHELL AND OF AN EXTERIOR WHEEL SHELL

This application claims the priority of German patent 197 54 188.7, filed Dec. 6, 1997, the disclosure of which is expressly incorporated by reference herein.

BACKGROUND AND SUMMARY OF THE INVENTION

The invention relates to a fastening arrangement for a vehicle wheel comprising an interior wheel shell and an exterior wheel shell, and in particular, to a vehicle wheel made of a light metal alloy and having a plurality of wheel bolts arranged concentrically with respect to a wheel hub.

From German Patent Document DE 196 01 778 A1, a vehicle wheel is known which consists of two shells. These shells comprise an interior wheel shell and an exterior wheel shell, the interior wheel shell forming a rim and the exterior wheel shell forming a rim spider of the wheel. The two wheel parts are connected with one another by welding. In addition, from German Patent Document DE-U 72 00 847, a two-shell vehicle wheel is known, in the case of which the wheel parts are connected with one another in the hub area by way of bush-type fastening elements into which wheel bolts are inserted.

It is an object of the invention to provide a simple mechanical connection in the wheel hub area for a two-shell vehicle wheel having hollow spokes.

This and other objects have been achieved according to the present invention by providing a fastening arrangement for a motor vehicle wheel comprising: an interior wheel shell; an exterior wheel shell; a plurality of wheel bolts to be arranged concentrically with respect to a wheel hub; and a plurality of bushes to be pressed and held in bores of the shells, said interior and exterior wheel shells being connectable with one another via said wheel bolts inserted in said bushes.

This and other objects have been achieved according to the present invention by providing a wheel for a vehicle, comprising: a plurality of wheel bolts for connecting said wheel to said vehicle; a plurality of bushes, each of said bushes defining an opening for receiving one of said wheel bolts; an interior wheel shell defining a plurality of openings for receiving said bushes; an exterior wheel shell defining a plurality of openings corresponding to the openings in said interior wheel shell for receiving said bushes, said interior and exterior wheel shells defining a plurality of hollow spokes and a wheel hub.

The principal advantages achieved according to the invention are that, due to the simple mechanical connection in the area of the wheel hub via bushes and wheel bolts, a sealing-off as well as a fastening take place. The bushes are inserted into the bores of the wheel shells by a press fit. This is required so that no water or moisture can penetrate into the hollow spaces between the shells. For this purpose, the bush may be embedded in a sealing mass, such as silicone.

The bushes are fitted into an indentation of the exterior wheel shell and are supported on the exterior wheel shell via a collar. As a result, a homogeneous introduction of a prestressing force is achieved.

The bush part adjoining the collar projects into bores of the two shells and, by way of its free end, may close off flush with the interior surface of the interior wheel shell or may end at a distance from it.

When a magnesium alloy is used for the wheel, for avoiding a contact corrosion between the interior wheel shell and the brake disk chamber made of steel, an intermediate disk made of an aluminum alloy will be required. This disk may be centered and fastened via the bushes pressed into the disk. As an alternative, the disk may be constructed to reach around the brake disk chamber and be centered and fastened on it by a form-locking or force-locking connection. With respect to the interior wheel shell, the disk is sealed off, for example, by silicone.

According to another preferred embodiment, the disk can be replaced by a chamber element which reaches around the brake disk chamber and is connected with it, for example, by a press fit. As a result of this chamber element, contact corrosion is avoided, the pressing-in depth can be corrected, and simultaneously the corrosion-endangered surface of the brake disk chamber is covered.

Instead of a pressed-in bush with a plane supporting surface with respect to the head of the wheel bolt, a hemispherical surface may also be provided in the head of the bush, in which a correspondingly shaped disk is supported.

Other objects, advantages and novel features of the present invention will become apparent from the following detailed description of the invention when considered in conjunction with the accompanying drawings.

DETAILED DESCRIPTION OF THE DRAWINGS

Figure 2:
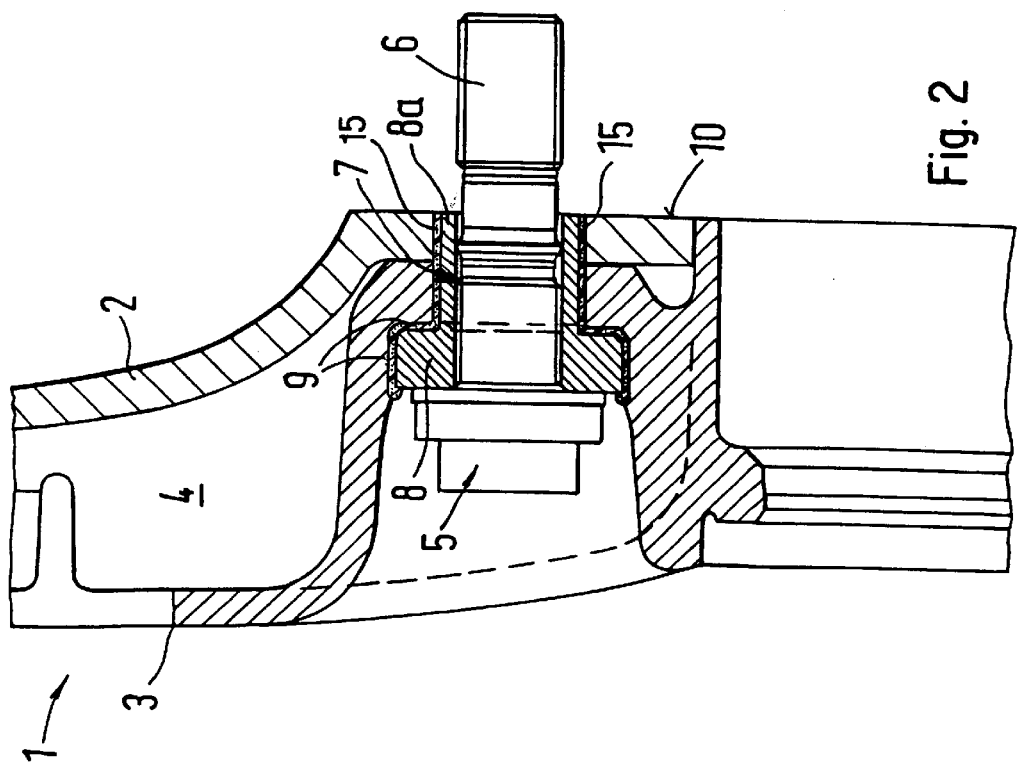
FIG. 2 is a sectional view of a portion of a vehicle wheel according to another preferred embodiment of the present invention without an intermediate disk.
Figure 1:
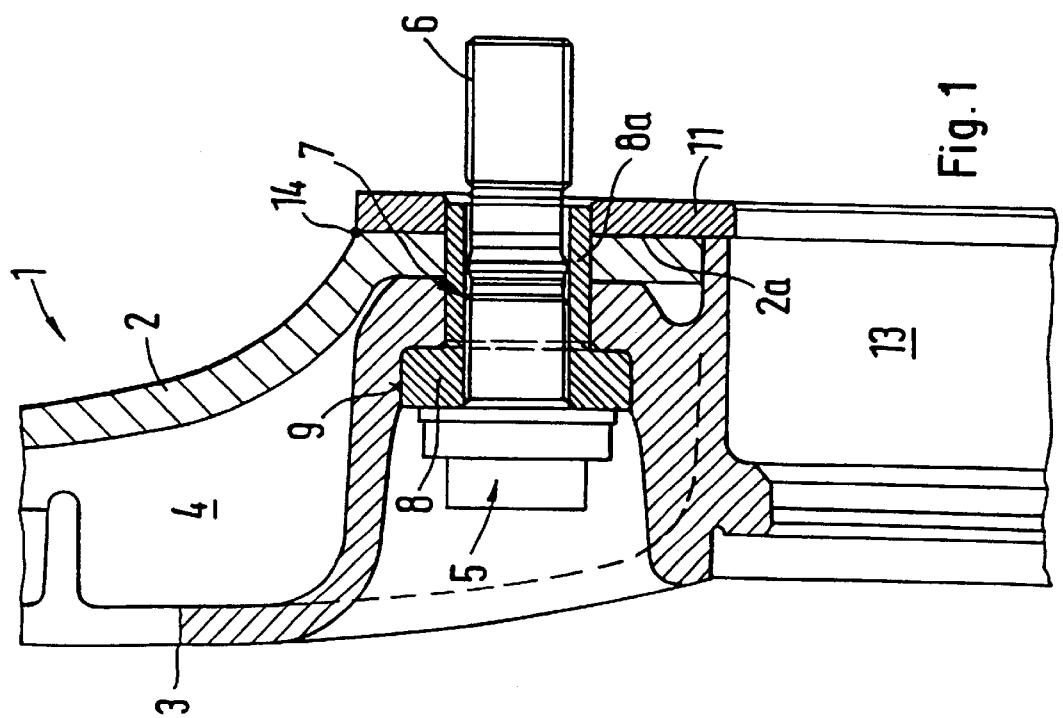
FIG. 1 is a sectional view of a portion of a vehicle wheel having an interior wheel shell, an exterior wheel shell, a bush for wheel bolts and an intermediate disk according to a preferred embodiment of the present invention.

FIGS. 1 and 2 illustrate a vehicle wheel 1 which comprises an interior wheel shell 2 and an exterior wheel shell 3 made of an aluminum alloy. Hollow areas 4 are defined by these two shells 2 and 3 to form hollow spokes. A connection of the two shells 2 and 3 takes place, on the one hand, via at least one weld (not shown) and via wheel bolts 5 arranged concentrically with respect to the wheel hub 13. In the assembled position shown in the drawings, the free ends 6 of the wheel bolts 5 extend into a brake disk chamber.

The wheels bolts 5 are arranged in bushes 7, which bushes 7 are inserted in bores of the shells 2, 3 by a press fit.

The bush 7 has a collar 8 which is supported in a recess 9 of the exterior wheel shell 3. The bush part 8a extends in the bores of the shells and, at its end proximate the free end 6, closes off flush with the interior surface 10 of the interior wheel shell 2, as shown in FIG. 2.

According to another embodiment of the invention shown in FIG. 1, for avoiding a contact corrosion at the location 2a between the wheel shell 2, 3 made of magnesium or a magnesium alloy and the brake disk chamber, an intermediate disk 11 is provided which consists of an aluminum alloy.

So that a sealing 15 is ensured between the two wheel shells 2 and 3, the bush 7 may be inserted into a sealing mass, such as silicone, as shown in FIG. 2. Likewise, the intermediate disk 11 can be sealed off with silicone 14 with respect to the interior wheel shell 2, as shown in FIG. 1.

Figure 3:
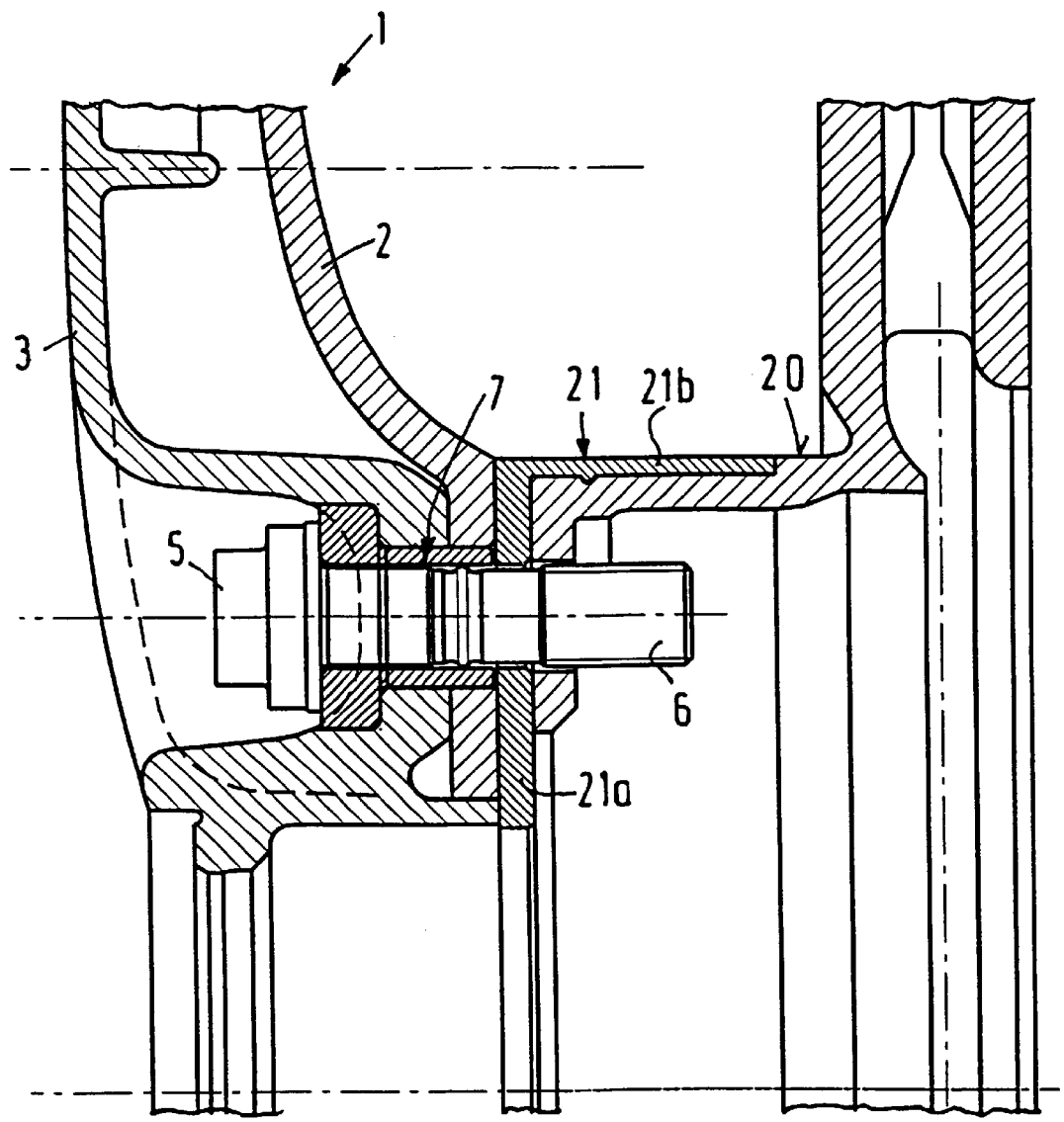
FIG. 3 is a view of another preferred embodiment of the present invention having a chamber element between the wheel and the brake disk.

According to FIG. 3, an embodiment is shown which, instead of a disk 11, shows a chamber spacer element 21 which extends by way of a part 21a between the wheel 1 and a brake disk chamber 20 and, by way of another part 21b, is fastened to the circumference of the brake disk chamber 20. The fastening can take place by gluing, a press fit, or the like.

Figure 4:
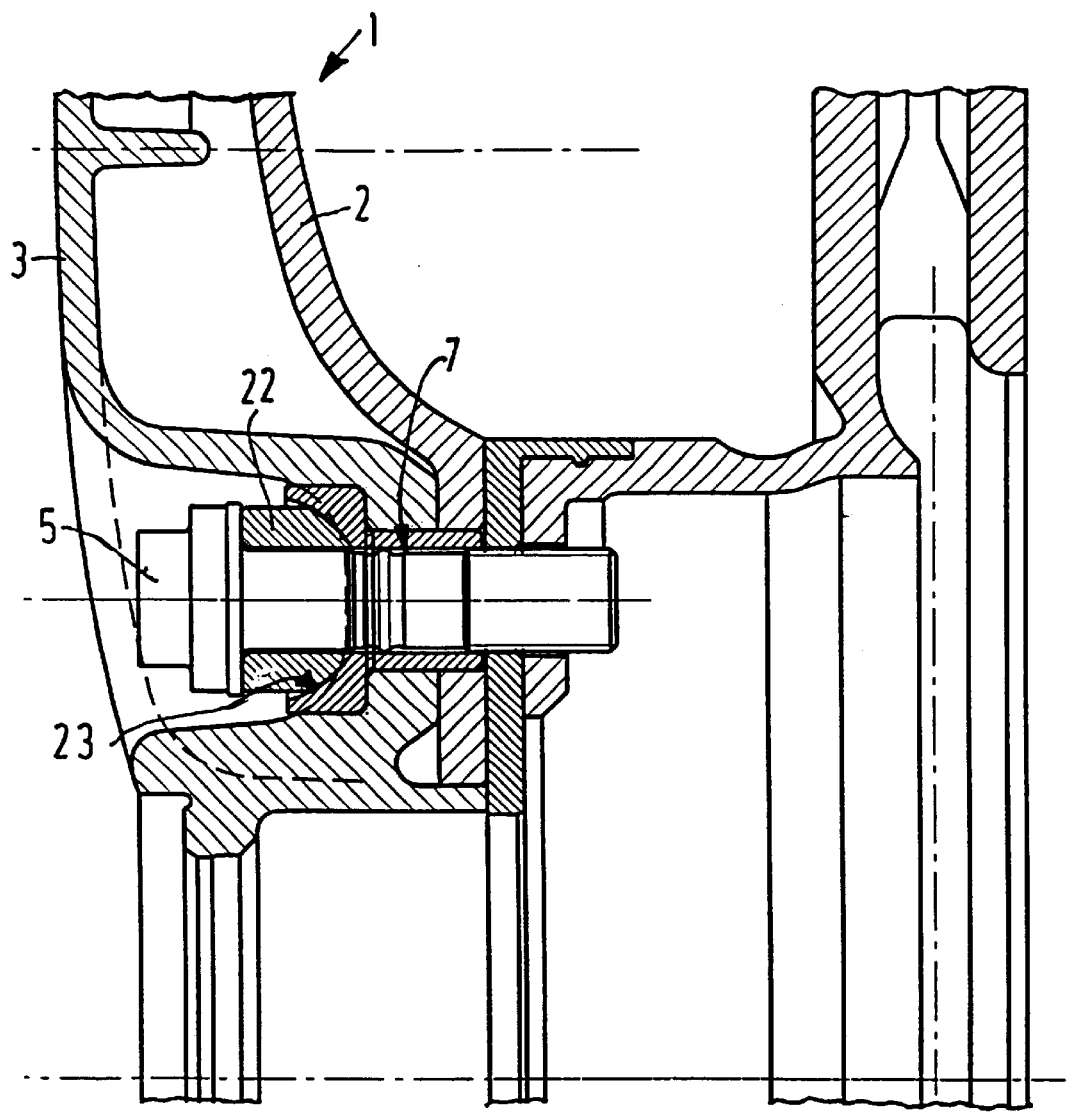
FIG. 4 is a view of an embodiment for all variants with an intermediate disk and a sleeve which have mutually corresponding spherical surfaces.

FIG. 4 illustrates an embodiment of the wheel bolt 5 with an intermediate disk 22 which has a spherical supporting surface 23 which is supported in a correspondingly constructed spherical surface of the bush 7. Such a construction of an intermediate disk 22 and a head of the bush is suitable for all shown embodiments (for example, the embodiments shown in FIGS. 1–3).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A wheel assembly comprising:

an interior wheel shell and an exterior wheel shell configured to form a wheel with a central hub section when the shells are connected with one another, fastening bores through the central hub section of said shells, respective fastening bores through the exterior shell being aligned with respective fastening bores through the interior shell when said shells are assembled together, bushes press fitted in the aligned bores and including respective bush collars supported at respective receiving sections of the exterior shell and adjoining bush parts extending through both shells, a brake chamber element forming a brake chamber facing the central hub section of the interior shell at a side opposite the exterior shell, said brake chamber element being made of a material different from the material of the interior wheel shell, a spacer member interposed between and abutting the interior wheel shell and the brake chamber element, and wheel bolts inserted in said bushes and protruding into the brake chamber through the shells and the spacer member, said wheel bolts operably clamping the shells together, wherein the spacer member is formed of a material different than the material of the brake chamber element and the material of the interior shell to thereby limit corrosion of the wheel assembly during use thereof, and wherein the spacer member includes a portion which surrounds and is connected with the brake chamber element.

2. A wheel assembly according to claim 1,
wherein the shells are made of a light metal alloy, and wherein the brake chamber element is made of steel.

3. A wheel assembly according to claim 1,
wherein the shells are made of a magnesium alloy,
wherein the brake chamber is made of steel, and
wherein the spacer member is made of aluminum.

4. A wheel assembly according to claim 1,
wherein the spacer member is a disk member.

5. A wheel assembly according to claim 1,
wherein respective free ends of said adjoining bush parts are disposed flush with an interior facing side of the interior shell.

6. A wheel assembly according to claim 1,
comprising intermediate disks interposed between respective bushes and respective wheel bolt heads, said intermediate disks and bushes having respective facing mating spherical support surfaces.

7. A wheel assembly according to claim 1,
comprising a sealing mass operably sealing the interior wheel shell with respect to the spacer member.

8. A wheel assembly according to claim 1,
wherein said interior and exterior wheel shells define a plurality of hollow spokes.

9. A wheel assembly according to claim 2,
wherein said interior and exterior wheel shells define a plurality of hollow spokes.

10. A wheel assembly according to claim 3,
wherein said interior and exterior wheel shells define a plurality of hollow spokes.

11. A wheel assembly according to claim 4,
wherein said interior and exterior wheel shells define a plurality of hollow spokes.

12. A wheel assembly according to claim 6,
wherein said interior and exterior wheel shells define a plurality of hollow spokes.

13. A wheel assembly according to claim 6,
comprising a sealing mass operably sealing the interior wheel shell with respect to the spacer member.

14. A wheel assembly according to claim 2,
comprising a sealing mass operably sealing the interior wheel shell with respect to the spacer member.

15. A wheel assembly according to claim 3,
comprising a sealing mass operably sealing the interior wheel shell with respect to the spacer member.

16. A wheel assembly according to claim 14,
comprising intermediate disk interposed between respective bushes and respective wheel bolt heads, said intermediate disks and bushes having respective facing mating spherical support surfaces.

17. A wheel assembly according to claim 16,
comprising a sealing mass operably sealing the interior wheel shell with respect to the spacer member.

18. A wheel assembly according to claim 17,
wherein said interior and exterior wheel shells define a plurality of hollow spokes.

19. A wheel assembly according to claim 1,
wherein the interior and exterior shells are also connected by welding.

20. A wheel assembly according to claim 8,
wherein the interior and exterior shells are also connected by welding.

* * * * *